United States Patent [19]

Yamazaki

[11] Patent Number: 5,538,548
[45] Date of Patent: Jul. 23, 1996

[54] RECORDING INK CONTAINING PIGMENT PARTICLES

[75] Inventor: Hideto Yamazaki, Nagoya, Japan

[73] Assignee: Brother Kogyo Kabushiki Kaisha, Aichi-ken, Japan

[21] Appl. No.: 453,798

[22] Filed: May 30, 1995

[30] Foreign Application Priority Data

Jun. 3, 1994 [JP] Japan ................................. 6-122760

[51] Int. Cl.$^6$ ................................................ C09D 11/02
[52] U.S. Cl. .................................. 106/20 C; 106/20 D
[58] Field of Search .............................. 106/20 C, 23 C, 106/20 D

[56] References Cited

U.S. PATENT DOCUMENTS

| | | | |
|---|---|---|---|
| 4,164,423 | 8/1979 | Schumacher et al. | 106/472 |
| 4,339,763 | 7/1982 | Kyser et al. | 346/140 R |
| 5,016,028 | 5/1991 | Temple | 346/140 R |
| 5,159,349 | 10/1992 | Endo et al. | 346/140 R |
| 5,288,160 | 2/1994 | Li et al. | 106/20 C |
| 5,376,169 | 12/1994 | Hotomi et al. | 106/20 C |
| 5,407,474 | 4/1995 | Airey et al. | 106/20 C |
| 5,417,747 | 5/1995 | Arata et al. | 106/20 C |
| 5,439,514 | 8/1995 | Kashiwazaki et al. | 106/20 C |
| 5,443,628 | 8/1995 | Loria et al. | 106/20 C |

*Primary Examiner*—Helene Klemanski
*Attorney, Agent, or Firm*—Oliff & Berridge

[57] ABSTRACT

A recording ink containing a pigment as a coloring agent, which is dispersed in an ink solvent, the pigment having a primary particle size of not larger than 30 nm, a DBP absorption of at least 75 ml/100 g, a specific surface area in a range of 100–300 m$^2$/g, and a tinting strength of at least 100.

16 Claims, No Drawings

RECORDING INK CONTAINING PIGMENT PARTICLES

BACKGROUND OF THE INVENTION

1. Field of the Invention

The present invention relates to a recording ink which includes pigment particles serving as a coloring agent and dispersed in the ink.

2. Discussion of Related Art

Conventionally, an aqueous dye ink composition, in which a dye as a coloring agent is dissolved in water, is widely used as a recording ink for use in an ink jet printer. To produce the ink composition, various kinds of water-soluble dyes are dissolved in water or a water-soluble organic solvent, and various additives are added as needed to the solution. However, the aqueous dye ink composition thus obtained exhibits insufficient water fastness and lightfastness, leaving some room for improvements.

In view of the above, there has been developed an ink composition containing a pigment or pigments, which exhibit(s) higher water fastness and lightfastness than the dyes as described above. The ink composition is generally used in ordinary printing methods, other than ink jet printing, such as photogravure, flexo graphic printing, screen printing, typographic printing and offset printing, or used in ordinary printing or coating methods, such as spraying, brushing, and doctor blade coating. The ink composition of this type contains as an ink solvent a volatile organic solvent, such as methyl ethyl ketone, toluene or xylene, which often includes a thermosetting resin or a UV-curable resin. The ink composition is easily cured by applying heat thereto or irradiating ultraviolet rays, and thus finds industrial applications in most cases, but hardly used in offices and homes. For example, the ink composition is used for printing manufacturing dates on the bottoms of cans of soft drinks.

In recent years, however, the above-described ink composition has been developed so as to exhibit excellent water fastness and lightfastness, so that the ink can be suitably used for printing by ink jet printers, which are usually used in offices and homes. To this end, the ink is required to exhibit optimum characteristics. More specifically, the ink should be free from sedimentation or coagulation even if it is not used for a long period of time, that is, should exhibit high storage stability. Further, the ink jet printer using the ink should not suffer from clogging of jet nozzles formed at the operating end of the printhead or ink channels formed in the printer, and is able to produce high quality print images.

The pigment-containing ink composition thus developed has improved water-fastness and light-fastness. However, the ink is still likely to clog the jet nozzles or ink channels of the ink jet printer, and exhibits relatively low stability after long-term storage, as compared with the dye-containing ink composition as described above. To solve these problems, the size of particles of the pigment, which greatly affects the quality of printed images, should be appropriately controlled, for dispersion in the ink solvent. If the median particle size or average particle size of the pigment particles dispersed in the ink solvent is relatively small, the ink does not incur clogging of the jet nozzles and/or ink channels of the printer, and exhibits excellent stability after long-term storage. If the particle size is too small, however, excessive blurring of printed images may result.

If the median size or average particle size of the pigment particles is relatively large, on the other hand, clogging of the jet nozzles and/or ink channels of the ink jet printer is likely to occur, and the stability of the ink is deteriorated when it is stored for a long period of time. Further, the ink having a relatively large pigment particle size cannot produce high-quality print images, due to a variation in colors, though the printed images are free from blurring. If bulky pigment particles are present in the ink composition, clogging of the jet nozzles and ink channels of the ink jet printer is likely to occur, and the long-term storage stability of the ink is deteriorated, even if the median or average particle size of the pigment particles is suitably controlled to a desired value.

If the pigment having a relatively low tinting strength is used in the ink composition, resulting printed images do not have a sufficiently high OD (optical density) level, that is, relatively low-quality print images may result, irrespective of the median or average particle size of the pigment. In this connection, printed images are considered to be of high quality if the OD level is not less than 1.2.

The above-indicated median or average particle size, presence of bulky particles, and tinting strength of the pigment particles dispersed in the ink solvent are greatly influenced by characteristics of the pigment itself. In other words, the pigment may be suitably selected to achieve desired median or average particle size and tinting strength, while avoiding inclusion of the bulky particles.

SUMMARY OF THE INVENTION

It is therefore an object of the present invention to provide a recording ink which shows high dispersibility of pigment particles, and sufficiently high stability even after it is stored for a long period of time, and which is able to produce high quality print images.

The above object may be accomplished according to the principle of the present invention, which provides a recording ink containing a pigment as a coloring agent, which is dispersed in an ink solvent, the pigment having a primary particle size of not larger than 30 nm, a DBP absorption of at least 75 ml/100 g, a specific surface area in a range of 100–300 $m^2/g$, and a tinting strength of at least 100.

In the recording ink according to the present invention, the pigment, which has an appropriate median or average particle size and does not include bulky particles, is uniformly dispersed in the ink solvent. Further, the present recording ink exhibits high stability even after it is stored for a long period of time, and is able to produce print images having a sufficiently high OD level. The ink of the invention can be advantageously used in an ink jetting device, such as an ink jet printhead, to effect ink jet printing on a recording medium. In this case, the ink is stably jetted or ejected from the printhead, without causing clogging of jet nozzles or ink channels of the printhead, to thus assure good print quality.

Preferably, the above-indicated pigment is carbon black.

DETAILED DESCRIPTION OF THE INVENTION

A recording ink according to one embodiment of the present invention consists principally of a solvent and a pigment, to which a dispersant, a resin and others are added as needed. The pigment serves as a coloring component of the ink. The dispersant serves to disperse particles of the pigment in the solvent, while the resin prevents coagulation of the pigment particles and improves water-fastness of the ink after printing. When the solvent is water, the ink is likely to dry, and tends to cause clogging of jet nozzles of a printhead of an ink jet printer. In this case, therefore, a wetting agent is added so as to prevent the ink from drying before reaching a recording medium on which the ink is to be deposited.

The pigment of the present ink is selected from particular carbon blacks which satisfy the conditions as described later. More specifically, the pigment may be selected from among: Color Black FW 18, Color Black S 170, Color Black S 160, Special Black 6, Special Black 5, Special Black 4, Printex 150T, Printex U, Printex V, Printex 90, Printex 80, Printex P, Printex 60, Printex L, and Printex L6, which are available from Degussa Japan Co., Ltd., Japan, MONARCH 880, MONARCH 700, and VULCAN 9A32, which are available from Cabot Specialty Chemicals Inc., Japan, and #990, #970, #950, #850, MA600, MA100, #44, and #40, which are available from Mitsubishi Kasei Corporation, Japan. The primary particle size, DBP absorption, tinting strength, and specific surface area of each of these carbon blacks are indicated in TABLE 1 below.

It is to be understood that the DBP absorption, tinting strength, and specific surface area of each sample of the pigment listed in TABLE 1 represent particular characteristics of the sample, that is, characteristics which are peculiar to the sample. To produce the ink according to the present invention, therefore, the pigments whose characteristics meet the conditions as described later are selected. These DBP absorption, tinting strength, and specific surface area are measured by respective methods known in the art and employed by the manufacturers of these samples. For example, the DBP absorption may be measured by a method according to JIS (Japanese Industrial Standard) K 6221. The tinting strength may be measured by the following manner. Initially, a test specimen of carbon black is ground and mixed with linseed oil, by means of a grinding mixer, to form a test paste. Similarly, a reference carbon black is formed into a reference paste. Each of these carbon black pastes is mixed by a grinding mixer with a paste of a known white pigment (ZnO) at a ratio of 1:50. The thus obtained two gray mixtures containing the test specimen and the reference carbon black are applied to a glass plate, and the luminous intensity of the two mixtures are measured according to DIN 53234, and compared with each other.

TABLE 1

| Carbon black | Primary particle size (nm) | DBP absorption (ml/100 g) | Specific surface area ($m^2/g$) | Tinting strength |
|---|---|---|---|---|
| Degussa | | | | |
| Color Black | | | | |
| FW 18 | 15 | 160 | 260 | 122 |
| S 170 | 17 | 150 | 200 | 121 |
| S 160 | 20 | 150 | 150 | 120 |
| Special Black | | | | |
| 6 | 17 | 160 | 300 | 110 |
| 5 | 20 | 130 | 240 | 110 |
| 4 | 25 | 110 | 180 | 100 |
| Printex | | | | |
| 150T | 29 | 115 | 110 | 100 |
| U | 25 | 115 | 100 | 108 |
| V | 25 | 115 | 100 | 108 |
| 90 | 14 | 95 | 300 | 124 |
| 80 | 16 | 100 | 220 | 124 |
| P | 20 | 100 | 120 | 110 |
| 60 | 21 | 116 | 115 | 105 |

TABLE 1-continued

| Carbon black | Primary particle size (nm) | DBP absorption (ml/100 g) | Specific surface area ($m^2/g$) | Tinting strength |
|---|---|---|---|---|
| L6 | 18 | 120 | 265 | 108 |
| L | 23 | 116 | 150 | 102 |
| Cabot | | | | |
| MONARCH | | | | |
| 880 | 16 | 112 | 220 | 153 |
| 700 | 18 | 122 | 200 | 148 |
| VULCAN 9A32 | 19 | 114 | 140 | 120 |
| Mitsubishi | | | | |
| #990 | 16 | 113 | 230 | 143 |
| #970 | 16 | 80 | 250 | 143 |
| #950 | 16 | 80 | 250 | 143 |
| #850 | 18 | 78 | 200 | 143 |
| MA600 | 18 | 130 | 150 | 130 |
| MA100 | 22 | 100 | 134 | 126 |
| #44 | 24 | 76 | 125 | 130 |
| #40 | 24 | 110 | 125 | 124 |

The dispersant may be selected from ionic (anionic and cationic) surfactants, amphoteric surfactants, nonionic surfactants, high molecular surfactants, and high molecular compounds, for example.

The anionic surfactants include alkyl sulfates and higher alkyl ether sulfates, more specifically, ammonium lauryl sulfate, and sodium polyoxyethylene lauryl ether sulfate, for example.

The cationic surfactants include aliphatic ammonium salts and amine salts, more specifically, alkyl trimethylammonium, and polyoxyethylene alkyl amine, for example.

The amphoteric surfactants may be of betain type, such as alkyl dimethyl betain, or of oxido type, such as alkyl dimethyl amine oxido, for example.

The nonionic surfactants include glycerol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, higher fatty acid alcohol ester, polyhydric alcohol fatty acid ester, and others.

The high molecular surfactants and high molecular compounds include high molecular weight polyurethane, polyester, high molecular polymer including a functional group, such as carbonyl group or amino group, which has a strong affinity for the pigment.

The resin may be suitably selected from vinyl resin, alkyd resin, acrylic resin, polyurethane, rosin ester and others, so that the selected resin does not precipitate or gel at jet printer operating temperatures or at room temperature once it is dissolved in the solvent.

The present recording ink preferably contains 3–20%, more preferably, 5–15% by weight of the pigment, 1–15%, more preferably, 2–10% by weight of the dispersant, and 1–10%, more preferably, 2–5% by weight of the resin.

The solvent for the present recording ink may be water or an organic solvent. The organic solvent, which has a low boiling point or a high vapor pressure, is likely to vaporize, and the ink may clog jet nozzles formed through the printhead of the ink jet printer. It is therefore desirable that the organic solvent has a relatively low volatility.

The low-volatile organic solvent is required to thoroughly dissolve the above components of the ink composition other than the pigment, and also serve as a wetting agent for preventing clogging of the jet nozzles of the printhead. It is also desirable to use a solvent which promotes absorption of the ink into a recording paper, and has a relatively high flashing point and small odor. Such a solvent may be selected from propylene glycol and its derivatives, aliphatic hydrocarbons, and dibasic acid esters, for example. More specifically, propylene glycol and its derivatives include propylene glycol, dipropylene glycol, tripropylene glycol, propylene glycol monomethyl ether, dipropylene glycol monomethyl ether, tripropylene glycol monomethyl ether, propylene glycol-n-butyl ether, dipropylene glycol-n-butyl ether, tripropylene glycol-n-butyl ether, propylene glycol methyl ether acetate, propylene glycol diacetate, and polypropylene glycol. The aliphatic hydrocarbons include IP solvent available from Idemitsu Petrochemical Co., Ltd., Japan, ISOSOL available from Nippon Petrochemicals Co., Ltd., Japan, ISOPAR available from Exxon Chemical Japan Ltd., Japan, and SHELLSOL available from Showa Shell Sekiyu K.K., Japan, for example. The dibasic acid esters include DBE available from Du Pont Japan Ltd., Japan, and IMSOL R available from ZENECA Colours, Japan.

When the solvent is water, a wetting agent, such as a glycol solvent, is desirably added. More specifically, the wetting agent may be selected from: glycerol, ethylene glycol, diethylene glycol, triethylene glycol, polyethylene glycol, propylene glycol, dipropylene glycol, tripropylene glycol, polypropylene glycol, trimethylene glycol, and hexylene glycol.

There will be hereinafter described seven examples of the present invention, and seven comparative examples. To clarify differences in characteristics of various kinds of carbon blacks serving as the pigment, an ink composition of one example contains the same amounts of the same solvent and additives, i.e., ink components other than carbon black, as that of the corresponding comparative example. That is, corresponding example and comparative example are different only in terms of the kind of the carbon black used as the pigment. It is to be understood that the additives and the amounts thereof are by no means limited to those of the following examples, but may be suitable selected.

EXAMPLE 1

A solvent was prepared from tripropylene glycol monomethyl ether, which has a surface tension of 30.7 dyn/cm at 25° C., and a vapor pressure of 0.02 mmHg at 20° C. Then, 3 parts by weight of a resin and 7 parts by weight of a dispersant were dissolved in 82 parts by weight of the above solvent, and 8 parts by weight of carbon black (Color Black S 170 as indicated in TABLE 1, available from Degussa Japan Co., Ltd.) was added as a pigment and tentatively mixed with the other components. The resin was a maleic acid resin, MALKYD No. 1 available from Arakawa Chemical Industries, Ltd., Japan, and the dispersant was prepared from a high molecular copolymer including a functional group which has a strong affinity for the pigment, more specifically, Disperbyk-163 available from BYK-Chemie GmbH, Germany. Then, the pigment was dispersed for 4 hours, in a beads mill, using 1 mm-diameter beads, while the mill was rotated at 4000 rpm. In this manner, there was obtained an ink which contained the carbon black having a median particle size of 0.092 μm. When the thus obtained ink composition was observed at ×1000 magnification with an optical microscope, it was found that particles of the carbon black were uniformly dispersed, and did not include bulky particles having a diameter of 0.5 μm or larger. The ink composition was used in an ink jet printhead having shear mode actuators, as disclosed in U.S. Pat. No. 5,016,028, to effect ink jet printing on a paper. The ink was effectively jetted or ejected from the printhead with high stability, and rapidly dried on the paper, assuring good print quality. The thus printed images had an OD (optical density) level of 1.20. The ink composition produced in the above manner was stored for 6 months at 70° C., or stored for one year at 50° C., and no sedimentation or coagulation of the pigment particles was found in either case.

Comparative Example 1

An ink composition similar to that of Example 1 was prepared in the above-described manner, using a different kind of carbon black, MONARCH 1000 available from Cabot Specialty Chemicals Inc, which has a larger specific surface area than the carbon black used in Example 1. The carbon black, MONARCH 1000, has a primary particle size of 16 nm, a DBP absorption of 105 ml/100 g, a specific surface area of 343 m$^2$/g, and a tinting strength of 140. The ink using this carbon black contained about 5 μm-diameter lumps as a result of agglomeration or coagulation of pigment (carbon black) particles. When the thus obtained ink was used in the ink jet printhead as described above, to effect ink jet printing, ink channels formed in the printhead were clogged with the ink, and the jet printing operation was interrupted or discontinued. The thus printed images obtained with this ink had an OD level of 1.23. The ink produced in the above manner solidified when it was stored for two weeks at 70° C. or stored for one month at 50° C.

EXAMPLE 2

20 parts by weight of a wetting agent (propylene glycol), 4 parts by weight of a resin and 5 parts by weight of a dispersant were dissolved in 61 parts by weight of water, and 10 parts by weight of carbon black (Special Black 4 as indicated in TABLE 1, available from Degussa Japan Co., Ltd.) was added as a pigment and tentatively mixed with the other components. The resin was polyvinyl pyrrolidone, PVP K-30, available from ISP Japan Ltd., Japan, and the dispersant was prepared from alkylolamine salt of a polyfunctional polymer, Disperbyk-181, available from BYK-Chemie GmbH. Then, the carbon black was dispersed for four hours in a beads mill, using 1 mm-diameter beads, while the mill was rotated at 4000 rpm. In this manner, there was obtained an ink composition which contained the carbon black having a median particle size of 0.090 μm. When the thus obtained ink composition was observed at ×1000 magnification with an optical microscope, it was found that particles of the carbon black were uniformly dispersed, and did not include bulky particles having a diameter of 0.5 μm or larger. When the ink composition was used in the ink jet printhead as described above, to effect ink jet printing on a paper, the ink was effectively jetted or ejected from the printhead with high stability, and rapidly dried on the paper, assuring good print quality. The thus printed images had an OD (optical density) level of 1.24. The ink composition produced in the above manner was stored for 6 months at 70° C., or stored for one year at 50° C., and no sedimentation or coagulation of the pigment particles was found in either case.

Comparative Example 2

An ink composition similar to that of Example 2 was prepared in the above-described manner, using a different kind of carbon black, VULCAN XC72R available from Cabot Specialty Chemicals Inc, which has a smaller tinting strength than the carbon black used in Example 2. The carbon black, VULCAN XC72R, has a primary particle size of 30 nm, a DBP absorption of 188 ml/100 g, a specific surface area of 254 m$^2$/g, and a tinting strength of 87. This carbon black had a median particle size of 0.090 μm, and did not include bulky particles having a 0.5 μm or larger diameter. When this ink composition was used in the ink jet printhead as described above, the ink was effectively jetted or ejected from the printhead with high stability. However, resulting print images had an OD level as low as 1.15, that is, high-quality print images were not obtained. No sedimentation of the pigment particles was found when the ink produced in the above manner was stored for 6 months at 70° C. or stored for one year at 50° C.

EXAMPLE 3

25 parts by weight of a wetting agent (tripropylene glycol), 4 parts by weight of a resin, and 4 parts by weight of a dispersant were dissolved in 60 parts by weight of water, and 7 parts by weight of carbon black (Printex 90 as indicated in TABLE 1, available from Degussa Japan Co., Ltd.) was added as a pigment and tentatively mixed with the other components. The resin was polyvinyl pyrrolidone, PVP K-30, available from ISP Japan Ltd., and the dispersant was prepared from a polyoxyethylene derivative, Emulgen A60, available from Kao Corporation, Japan. Then, the carbon black was dispersed for four hours in a beads mill, using 1 mm-diameter beads, while the mill was rotated at 4000 rpm. In this manner, there was obtained an ink composition which contained the carbon black having a median particle size of 0.077 μm. When the thus obtained ink composition was observed at ×1000 magnification with an optical microscope, it was found that particles of the carbon black were uniformly dispersed, and did not include bulky particles having a diameter of 0.5 μm or larger. When the ink composition was used in the ink jet printhead as described above, to effect ink jet printing on a paper, the ink was effectively jetted or ejected from the printhead with high stability, assuring good print quality. The thus printed images had an OD level of 1.21. The ink composition produced in the above manner was stored for 6 months at 70° C., or stored for one year at 50° C., and no sedimentation of the pigment particles was found in either case.

Comparative Example 3

An ink composition similar to that of Example 3 was prepared in the above-described manner, using a different kind of carbon black, Printex 85 available from Degussa Japan Co., Ltd., which has a lower DBP absorption than the carbon black used in Example 3. The carbon black, Printex 85, has a primary particle size of 16 nm, a DBP absorption of 48 ml/100 g, a specific surface area of 200 m$^2$/g, and a tinting strength of 120. This carbon black had a median particle size of 0.185 μm, and included a lot of bulky particles having a 0.5 μm or larger diameter when the ink composition was observed at ×1000 magnification with an optical microscope. When this ink composition was used in the ink jet printhead as described above, to effect ink jet printing, ink channels formed in the printhead were clogged with the ink, and the ink jet printing operation was interrupted or discontinued. Printed images obtained with this ink had an OD level of 1.20. Hard sediments of the pigment particles were found after the ink was stored for two weeks at 70° C. or for one month at 50° C.

EXAMPLE 4

15 parts by weight of a wetting agent (glycerol), 4 parts by weight of a resin, and 4 parts by weight of a dispersant were dissolved in 69 parts by weight of water, and 8 parts by weight of carbon black (#990 as indicated in TABLE 1, available from Mitsubishi Kasei Corporation) was added as a pigment and tentatively mixed with the other components. The resin was polyvinyl pyrrolidone, PVP K-30, available from ISP Japan Ltd., and the dispersant was prepared from a polyoxyethylene derivative, Emulgen B66, available from Kao Corporation. Then, the carbon black was dispersed for four hours in a beads mill, using 1 mm-diameter beads, while the mill was rotated at 4000 rpm. In this manner, there was obtained an ink composition which contained the carbon black having a median particle size of 0.080 μm. When the thus obtained ink composition was observed at ×1000 magnification with an optical microscope, it was found that particles of the carbon black were uniformly dispersed, and did not include bulky particle having a 0.5 μm or larger diameter. When the ink composition was used in the ink jet printhead as described above, to effect ink jet printing, the ink was effectively jetted or ejected from the printhead with high stability, assuring good print quality. The thus printed images had an OD level of 1.20. The ink composition produced in the above manner was stored for 6 months at 70° C., or stored for one year at 50° C., and no sedimentation of the pigment particles was found in either case.

Comparative Example 4

An ink composition similar to that of Example 4 was prepared in the above-described manner, using a different kind of carbon black, #20 available from Mitsubishi Kasei Corporation, which has a larger primary particle size than the carbon black used in Example 4. The carbon black, #20, has a primary particle size of 40 nm, a DBP absorption of 122 ml/100 g, a specific surface area of 56 m$^2$/g, and a tinting strength of 75. This carbon black had a median particle size of 0.210 μm, and included a lot of bulky particles having a 10 μm or larger diameter when the ink composition was observed at ×1000 magnification with an optical microscope. When this ink composition was used in the ink jet printhead as described above, to effect ink jet printing, ink channels formed in the printhead were clogged with the ink, and the ink jet printing was thus interrupted. Printed images obtained with this ink had a low OD level of 1.10. When the ink composition produced in the above manner was stored for two weeks at 70° C. or for one month at 50° C., hard sediments of the pigment particles were found.

EXAMPLE 5

10 parts by weight of a wetting agent (triethylene glycol), 4 parts by weight of a resin, and 4 parts by weight of a dispersant were dissolved in 73 parts by weight of water, and 9 parts by weight of carbon black (MA100 as indicated in TABLE 1, available from Mitsubishi Kasei Corporation) was added as a pigment and tentatively mixed with the other components. The resin was polyvinyl pyrrolidone, PVP K-30, available from ISP Japan Ltd., and the dispersant was prepared from a polyoxyethylene derivative, Emulgen 911, available from Kao Corporation. Then, the carbon black was dispersed for four hours in a beads mill, using 1 mm-diameter beads, while the mill was rotated at 4000 rpm. In this manner, there was obtained an ink composition which contained the carbon black having a median particle size of 0.120 μm. When the thus obtained ink composition was observed at ×1000 magnification with an optical microscope, it was found that particles of the carbon black were uniformly dispersed, and did not include bulky particle having a 0.5 μm or larger diameter. When the ink composition was used in the ink jet printhead as described above, to effect ink jet printing on a paper, the ink was effectively jetted or ejected from the printhead with high stability, assuring good print quality. The thus printed images had an OD level of 1.25. When the ink composition produced in the above manner was stored for 6 months at 70° C., or for one year at 50° C., no sedimentation of the pigment particles was found in either case.

Comparative Example 5

An ink composition similar to that of Example 5 was prepared in the above-described manner, using a different kind of carbon black, MA7 available from Mitsubishi Kasei Corporation, which has a lower oil absorption than the carbon black used in Example 5. The carbon black, MA7, has a primary particle size of 24 nm, a DBP absorption of 65 ml/100 g, a specific surface area of 137 $m^2/g$, and a tinting strength of 136. This carbon black had a median particle size of 0.210 μm, and included a lot of bulky particles having a 10 μm or larger diameter when the ink composition was observed at ×1000 magnification with an optical microscope. When this ink composition was used in the ink jet printhead as described above, to effect ink jet printing, ink channels formed in the printhead were clogged with the ink, and the ink jet printing was thus interrupted. Printed images obtained with this ink had an OD level of 1.22. When the ink composition produced in the above manner was stored for two weeks at 70° C. or for one month at 50° C., hard sediments of the pigment particles were found.

EXAMPLE 6

10 parts by weight of a wetting agent (propylene glycol), 4 parts by weight of a resin, and 4 parts by weight of a dispersant were dissolved in 75 parts by weight of water, and 7 parts by weight of carbon black (#44 as indicated in TABLE 1, available from Mitsubishi Kasei Corporation) was added as a pigment and tentatively mixed with the other components. The resin was polyvinyl pyrrolidone, PVP K-30, available from ISP Japan Ltd., and the dispersant was prepared from a polyoxyethylene derivative, Emulgen 920, available from Kao Corporation. Then, the carbon black was dispersed for four hours in a beads mill, using 1 mm-diameter beads, while the mill was rotated at 4000 rpm. In this manner, there was obtained an ink composition which contained the carbon black having a median particle size of 0.130 μm. When the thus obtained ink composition was observed at ×1000 magnification with an optical microscope, it was found that particles of the carbon black were uniformly dispersed, and did not include bulky particle having a 0.5 μm or larger diameter. When the ink composition was used in the ink jet printhead as described above, to effect ink jet printing on a paper, the ink was effectively jetted or ejected from the printhead with high stability, assuring good print quality. The thus printed images had an OD level of 1.20. The ink composition produced in the above manner was stored for 6 months at 70° C., or for one year at 50° C., and no sedimentation of the pigment particles was found in either case.

Comparative Example 6

An ink composition similar to that of Example 6 was prepared in the above-described manner, using a different kind of carbon black, MONARCH 460 available from Cabot Specialty Chemicals Inc., which has a smaller specific surface area than the carbon black used in Example 6. The carbon black, MONARCH 460, has a primary particle size of 27 nm, a DBP absorption of 100 ml/100 g, a specific surface area of 80 $m^2/g$, and a tinting strength of 102. This carbon black had a median particle size of 0.200 μm, and included a lot of bulky particles having a 5 μm or larger diameter when the ink composition was observed at ×1000 magnification with an optical microscope. When this ink composition was used in the ink jet printhead as described above, to effect ink jet printing, ink channels formed in the printhead were clogged with the ink, and the ink jet printing was thus interrupted. Printed images obtained with this ink had an OD level of 1.20. When the ink composition produced in the above manner was stored for two weeks at 70° C. or for one month at 50° C., hard sediments of the pigment particles were found.

EXAMPLE 7

A solvent was prepared from tripropylene glycol monomethyl ether, which has a surface tension of 30.7 dyn/cm at 25° C., and a vapor pressure of 0.02 mmHg at 20° C. Then, 3 parts by weight of a resin and 7.5 parts by weight of a dispersant were dissolved in 84.5 parts by weight of the above solvent, and 5 parts by weight of carbon black (MONARCH 700 as indicated in TABLE 1, available from Cabot Specialty Chemicals Inc.) was added as a pigment and tentatively mixed with the other components. The resin was acrylic resin, ELVACITE 2013, available from Du Pont Japan Ltd., and the dispersant was prepared from high molecular weight polyurethane having a 35% solid portion, EFKA 47EA, available from EFKA CHEMICALS. Then, the carbon black was dispersed for four hours in a beads mill, using 1 mm-diameter beads, while the mill was rotated at 4000 rpm. In this manner, there was obtained an ink composition which contained the carbon black having a median particle size of 0.080 μm. When the thus obtained ink composition was observed at ×1000 magnification with an optical microscope, it was found that particles of the carbon black were uniformly dispersed, and did not include bulky particle having a 0.5 μm or larger diameter. When the ink composition was used in the ink jet printhead as described above, to effect ink jet printing on a paper, the ink was effectively jetted or ejected from the printhead with high stability, and rapidly dried on the paper, assuring good print quality. The thus printed images had an OD level of 1.25. The ink composition produced in the above manner was stored for 6 months at 70° C., or for one year at 50° C., and no sedimentation of the pigment particles was found in either case.

Comparative Example 7

An ink composition similar to that of Example 7 was prepared in the above-described manner, using a different kind of carbon black, REGAL 250R available from Cabot Specialty Chemicals Inc., which has a larger primary particle size, smaller DBP absorption, smaller specific surface area and smaller tinting strength than the carbon black used in Example 7. The carbon black, REGAL 250R, has a primary particle size of 35 nm, a DBP absorption of 46 ml/100 g, a specific surface area of 50 $m^2/g$, and a tinting strength of 95. This carbon black had a median particle size of 0.160 μm, and included some bulky particles having a 5 μm or larger size when the ink composition was observed at ×1000 magnification with an optical microscope. When this ink composition was used in the ink jet printhead as described above, to effect ink jet printing, ink channels of the printhead were clogged with the ink, and the ink jet printing was thus interrupted. Printed images obtained with this ink had a low OD level of 1.15, that is, high-quality print images were not obtained. When the ink composition produced in the above manner was stored for two weeks at 70° C. or for one month at 50° C., coagulations and soft sediments of the pigment particles were found.

The primary particle size (nm), DBP absorption (ml/100 g), specific surface area (m$^2$/g) and tinting strength of each of the carbon blacks used in Examples 1–7 and Comparative Examples 1–7 are indicated in TABLE 2. Also indicated in this table are presence of 0.5 µm or larger diameter pigment particles in each of the ink compositions of these examples, OD level of print images obtained with each ink composition, and presence of sediments and/or coagulations of the pigment particles after long-term storage.

in Comparative Example 7 has a primary particle size that is larger than 30 nm, a DBP absorption that is smaller than 75 ml/100 g, a specific surface area that is smaller than 100 m$^2$/g, and a tinting strength that is smaller than 100.

There were produced further examples of ink compositions, using the carbon blacks as indicated in TABLE 1, other than those used in Examples 1 through 7. These ink compositions did not include bulky particles having a 0.5 µm or larger diameter, and produced print images having an at least 1.20 OD level. Further, no sedimentation of pigment particles was found after the ink of each example was stored for six months at 70° C. or for one year at 50° C. When the ink composition of each example was used in the ink jet printhead as described above, to effect ink jet printing on a paper, the ink was stably jetted or ejected from the printhead, and rapidly dried on the paper, assuring good print quality.

TABLE 2

|  | Primary particle size (nm) | DBP absorption (ml/100 g) | Specific surface area (m$^2$/g) | Tinting strength | Presence of 0.5 µm or larger size particles | OD level | Presence of sediments of coagulations |
| --- | --- | --- | --- | --- | --- | --- | --- |
| Example |  |  |  |  |  |  |  |
| 1 | 17 | 150 | 200 | 121 | None | 1.20 | None |
| 2 | 25 | 110 | 180 | 100 | None | 1.24 | None |
| 3 | 14 | 95 | 300 | 124 | None | 1.21 | None |
| 4 | 16 | 113 | 230 | 143 | None | 1.20 | None |
| 5 | 22 | 100 | 134 | 126 | None | 1.25 | None |
| 6 | 24 | 76 | 125 | 130 | None | 1.20 | None |
| 7 | 18 | 122 | 200 | 148 | None | 1.25 | None |
| Comparative Examples |  |  |  |  |  |  |  |
| 1 | 16 | 105 | 343 | 140 | Yes | 1.23 | Yes |
| 2 | 30 | 188 | 254 | 87 | None | 1.15 | None |
| 3 | 16 | 48 | 200 | 120 | Yes | 1.20 | Yes |
| 4 | 40 | 122 | 56 | 75 | Yes | 1.10 | Yes |
| 5 | 24 | 65 | 137 | 136 | Yes | 1.22 | Yes |
| 6 | 27 | 100 | 80 | 102 | Yes | 1.20 | Yes |
| 7 | 35 | 46 | 50 | 95 | Yes | 1.15 | Yes |

It will be understood from TABLE 2 that the ink compositions of Examples 1. through 7, using carbon blacks having a primary particle size of not larger than 30 nm, a DBP absorption of at least 75 ml/100 g, a specific surface area in the range of 100 to 300 m$^2$/g, and a tinting strength of at least 100, did not include 0.5 µm or larger diameter bulky particles, produced print images having an at least 1.20 OD level, and did not incur sedimentation and/or coagulation of the pigment particles.

In contrast, the ink compositions of Comparative Examples 1 through 7, using carbon blacks which do not satisfy all of the above-described conditions, included 0.5 µm or larger diameter bulky particles, or produced print images having less than 1.20 OD level, or resulted in sedimentation and/or coagulation of the pigment particles. More specifically, the specific surface area of the carbon black used in Comparative Example 1 is larger than 300 m$^2$/g, and the tinting strength of the carbon black used in Comparative Example 2 is less than 100, while the DBP absorption of the carbon black used in Comparative Example 3 is smaller than 75 ml/100 g. The carbon black used in Comparative Example 4 has a primary particle size that is larger than 30 nm, and a specific surface area that is smaller than 100 m$^2$/g. The DBP absorption of Comparative Example 5 is smaller than 75 ml/100 g, and the specific surface area of the carbon black used in Comparative Example 6 is smaller than 100 m$^2$/g. The carbon black used It is to be noted that the carbon blacks as indicated in TABLE 1 have a primary particle size of not larger than 30 nm, a DBP absorption of at least 75 ml/100 g, a specific surface area in the range of 100 to 300 m$^2$/g, and a tinting strength of at least 100.

It will be understood from the above description that the ink compositions of Examples 1 through 7 were free from bulky particles, ensured at least 1.20 OD level, and exhibited excellent storage stability, since the carbon blacks used in these ink compositions have a primary particle size of not larger than 30 nm, a DBP absorption of at least 75 ml/100 g, a specific surface area in the range of 100 to 300 m$^2$/g, and a tinting strength of at least 100. The ink compositions can be used in an ink jet printhead, without causing clogging of jet nozzles or ink channels of the printhead, to assure good ink jetting performance and high print quality.

While the beads mill was used for dispersing the pigment in Examples 1–7 and Comparative Examples 1–7, ball mill, sand mill, attrition mill, roller mill, agitator, 10 Henshel type mixer, colloid mill, ultrasonic homogenizer, extra-high-voltage homogenizer, or pearl mill, for example, may be used for dispersing the pigment.

While the ink jet printhead having shear mode actuators, as disclosed in U.S. Pat. No. 5,016,028, was used in all the above examples, other ink jet printhead, such as a Kyser type as disclosed in U.S. Pat. No. 4,339,763, or a thermal head type as disclosed in U.S. Pat. No. 5,159,349, may be used to evaluate the characteristics of the inks. In this case, similar results as obtained in the respective examples were obtained.

What is claimed is:

1. A recording ink comprising a pigment dispersed in a low-volatility organic solvent selected from the group consisting of propylene glycol and its derivatives, aliphatic hydrocarbons, and dibasic acid esters, wherein said pigment has a primary particle size of not larger than 30 nm, a DBP absorption of at least 75 ml/100 g, a specific surface area in a range of 100–300 $m^2/g$ and a tinting strength of at least 100.

2. A recording ink according to claim 1, wherein said pigment comprises carbon black.

3. A recording ink according to claim 1, which is used in an ink jetting device for jetting the ink through a nozzle formed therethrough, so as to effect printing on a recording medium.

4. A recording ink according to claim 1, comprising 3–20% by weight of said pigment.

5. A recording ink according to claim 1, further comprising a dispersant for dispersing said pigment in said solvent.

6. A recording ink according to claim 5, comprising 3–20% by weight of said pigment, and 1–15% by weight of said dispersant.

7. A recording ink according to claim 1, further comprising 1–10% by weight of a resin.

8. A recording ink comprising a pigment dispersed in water and a wetting agent, wherein said pigment has a primary particle size of not larger than 25 nm, a DPB absorption of at least 75 ml/100 g, a specific surface area in a range of 100–300 $m^2/g$, and a tinting strength of at least 100.

9. A recording ink according to claim 8, wherein said wetting agent is glycol.

10. A recording ink according to claim 8, wherein said pigment comprises carbon black.

11. A recording ink according to claim 8, which is used in an ink jetting device for jetting the ink through a nozzle formed therethrough, so as to effect printing on a recording medium.

12. A recording ink according to claim 8, comprising 3–20% by weight of said pigment.

13. A recording ink according to claim 8, further comprising a dispersant for dispersing said pigment in said water.

14. A recording ink according to claim 13, comprising 3–20% by weight of said pigment, and 1–15% by weight of said dispersant.

15. A recording ink according to claim 8, further comprising 1–10% by weight of a resin.

16. A recording ink comprising a pigment dispersed in a solvent, wherein said pigment has a primary particle size of not larger than 25 nm, a DBP absorption of at least 75 ml/100 g, a specific surface area in a range that is greater than 150 $m^2/g$ and not more than 300 $m^2/g$, and a tinting strength of a least 100.

* * * * *